(12) United States Patent
Rose et al.

(10) Patent No.: US 9,477,272 B2
(45) Date of Patent: Oct. 25, 2016

(54) PREVENTION OF REMOVAL OF SOLID STATE DRIVE FROM COMPUTER HOUSING WITH DATA BEING ACCESSIBLE THEREON

(71) Applicant: Lenovo (Singapore) Pte. Ltd., New Tech Park (SG)

(72) Inventors: Amy Leigh Rose, Chapel Hill, NC (US); Albert Ray Sauer, Raleigh, NC (US); Nathan J. Peterson, Durham, NC (US); John Scott Crowe, Durham, NC (US)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 0 days.

(21) Appl. No.: 14/601,660

(22) Filed: Jan. 21, 2015

(65) Prior Publication Data

US 2016/0209890 A1    Jul. 21, 2016

(51) Int. Cl.
*G06F 1/16* (2006.01)
*G06F 1/18* (2006.01)

(52) U.S. Cl.
CPC .............. *G06F 1/182* (2013.01); *G06F 1/187* (2013.01)

(58) Field of Classification Search
CPC .... G06F 1/1632; G06F 1/165; H05K 1/0271
USPC ......... 455/575.4, 556.1, 575.8, 569.1, 575.2, 455/575.1, 575.6; 248/231.91, 224.7, 27.1, 248/311.2, 157, 209, 917, 158, 317, 476; 345/169, 4, 170, 208, 168, 102, 156, 345/173; 361/679.34, 679.35, 679.01, 361/679.08, 679.09, 679.23, 679.27, 361/679.26, 679.33, 679.47, 679.49, 361/679.05, 679.21, 679.42, 679.41, 361/679.32; 174/51

See application file for complete search history.

(56) References Cited

U.S. PATENT DOCUMENTS

| | | | |
|---|---|---|---|
| 6,304,457 B1 * | 10/2001 | Liu | G06F 1/184 174/51 |
| 6,396,400 B1 | 5/2002 | Epstein et al. | |
| 8,971,036 B1 * | 3/2015 | Lau | G06F 1/20 361/679.34 |
| 2003/0210519 A1 * | 11/2003 | Wubs | G11B 33/08 361/679.35 |

FOREIGN PATENT DOCUMENTS

| | | |
|---|---|---|
| DE | 3023427 A1 | 1/1981 |
| FR | 2710179 A1 | 3/1995 |
| GB | 2182176 | 5/1987 |

* cited by examiner

*Primary Examiner* — Hung Duong
(74) *Attorney, Agent, or Firm* — John L. Rogitz; John M. Rogitz (57) ABSTRACT

In one aspect, a device includes at least one solid state drive (SSD) and an element which prevents removal of the device from a computer housing with which the device engages with unique data on the SSD being accessible.

20 Claims, 6 Drawing Sheets

PREVENTION OF REMOVAL OF SOLID STATE DRIVE FROM COMPUTER HOUSING WITH DATA BEING ACCESSIBLE THEREON

I. FIELD

The present application relates generally to prevention of removal of a solid state drive from a computer housing while data is accessible on the solid state drive.

II. BACKGROUND

As recognized herein, storage drives are often removed or stolen from computers such as servers by unauthorized individuals. Often times, these storage drives contain sensitive and/or confidential information, which should be protected and which can be exploited by the unauthorized individuals to the detriment of the person to which the data pertains. Current solutions to protecting such data are inadequate.

SUMMARY

Accordingly, in one aspect a device includes at least one solid state storage drive (SSD) and an element which prevents removal of the device from a computer housing with which the device engages with unique data on the SSD being accessible.

In another aspect, a method includes providing at least one solid state storage drive (SSD) and providing at least one mechanism which prevents removal of the SSD from a server with which the SSD is engageable when the SSD is engaged with the server and with unique data on the SSD being accessible.

In still another aspect, a solid state storage drive (SSD) includes solid state storage housed in a housing and at least one mechanism which disallows removal of the SSD from a computer structure with which the SSD engages with data stored on the solid state storage which is readable by a processor.

The details of present principles, both as to their structure and operation, can best be understood in reference to the accompanying drawings, in which like reference numerals refer to like parts, and in which:

DETAILED DESCRIPTION

This disclosure relates generally to device-based information. With respect to any computer systems discussed herein, a system may include server and client components, connected over a network such that data may be exchanged between the client and server components. The client components may include one or more computing devices including televisions (e.g. smart TVs, Internet-enabled TVs), computers such as desktops, laptops and tablet computers, so-called convertible devices (e.g. having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by e.g. a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g. that may not be a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

"A system having one or more of A, B, and C" (likewise "a system having one or more of A, B, or C" and "a system having one or more of A, B, C") includes systems that have A alone, B alone, C alone, A and B together, A and C together, B and C together, and/or A, B, and C together, etc.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Figure 1:
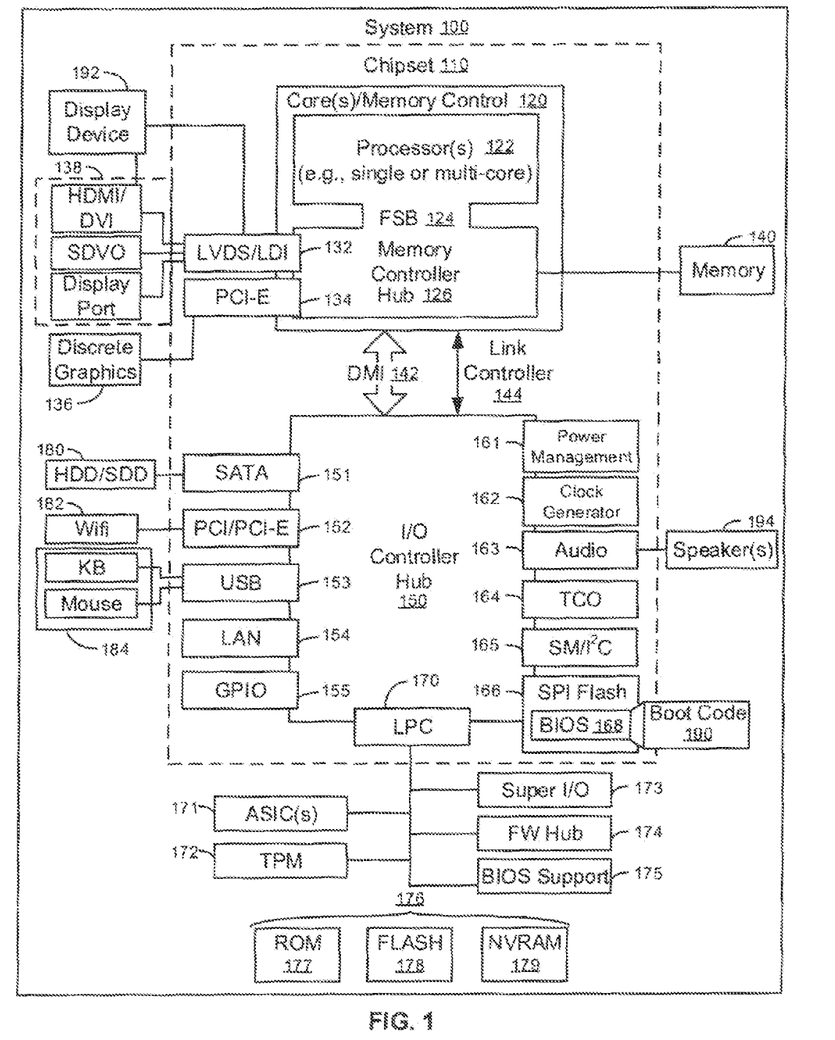
FIG. 1 is a block diagram of an example system in accordance with present principles.

Now specifically in reference to FIG. 1, it shows an example block diagram of an information handling system and/or computer system 100. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be e.g. a game console such, as XBOX® or Playstation®.

As shown in FIG. 1, the system 100 includes a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support, for DDR SDRAM memory (e.g., DDR, DDR2, DDR3, etc.). In general, the memory 140 is a type of random-access memory (RAM), It is often referred to as "system memory".

The memory controller hub 126 further includes a low-voltage differential signaling interface (LVDS) 132. The LVDS 132 may be a so-called LVDS Display Interlace (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including e.g. one of more GPUs). An example system may include AGP or PCI-E for support of graphics.

The I/O hub controller 150 includes a variety of interfaces. The example of FIG. 1 includes a SATA interface 151, one or mote PCI-E interfaces 152 (optionally one or more legacy PCI interfaces), one or more USB interfaces 153, a LAN interface 154 (more generally a network interface for communication over at least one network such as the Internet; a WAN, a LAN, etc. under direction of the processors) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 provide for communication with various devices, networks, etc. For example, the SATA interface 151 provides for reading, writing or reading and writing information on one or more storage drives 180 such as HDDs, SDDs, solid state drives (SSDs) or a combination thereof, but in any case the drives ISO are understood to be e.g. tangible computer readable storage mediums that may not be transitory signals. The I/O hub controller 150 may also include an advanced host controller interface (AHCI) to support one or more drives 180. The PCI-E interface 152 shows for wireless connections 182 to devices, networks, etc. The USB interface 153 provides for input devices 184 such, as keyboards (KB), mice and various other devices (e.g., cameras, phones, storage, media players, etc.).

In the example of FIG. 1, the LPC interface 170 provides tor use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verity that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, though now shown for clarity, in some embodiments the system 100 may include a gyroscope for e.g. sensing and/or measuring the orientation of the system 100 and providing input related thereto to the processor 122, an accelerometer for e.g. sensing acceleration and/or movement of the system 100 and providing input related thereto to the processor 122, an audio receiver/microphone providing input to the processor 122 e.g. based on a user providing audible input to the microphone, and a camera for gathering one or more images and providing input related thereto to the processor 122. The camera may be, e.g., a thermal imaging camera, a digital camera such as a webcam, and/or a camera integrated into the system 100 and controllable by the processor 122 to gather pictures/images and/or video. Still further, and also not shown tor clarity, the system 100 may include a GPS transceiver that is configured to e.g. receive geographic position information from at least one satellite and provide the information to the processor 122. However, it is to be understood that another suitable position receiver other than a GPS receiver may be used in accordance with present principles to e.g. determine the location of the system 100.

Figure 2:
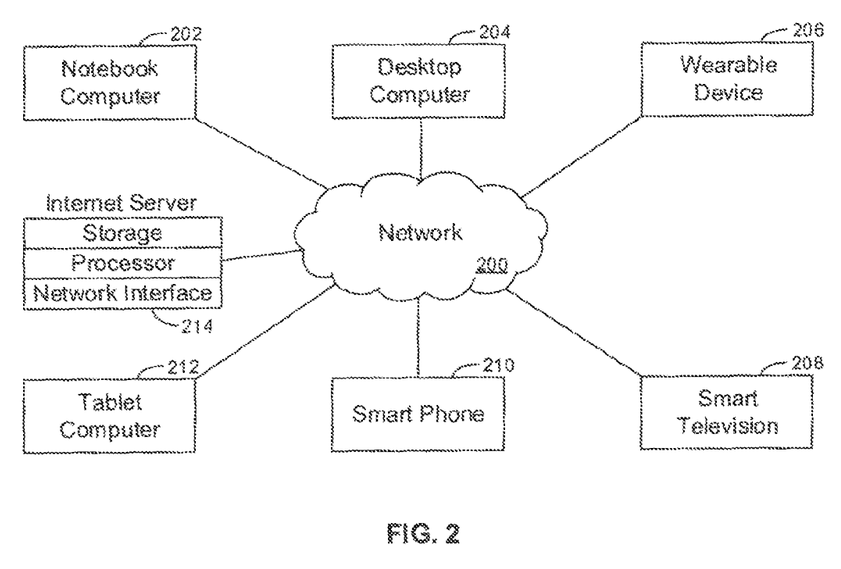
FIG. 2 is a block diagram of a network of devices in accordance with present principles.

Before moving on to FIG. 2, it is to be understood that an example client device or other machine/computer may include fewer or more features than shown on the system 100 of FIG. 1. In any case, it is to be understood at least based on the foregoing that the system 100 is configured to undertake present principles.

Turning now to FIG. 2, it shows example devices communicating over a network 200 such as e.g. the Internet in accordance with present principles. It is to be understood that e.g. each of the devices described in reference to FIG. 2 may include at least some of the features, components, and/or elements of the system 100 described above. In any case, FIG. 2 shows a notebook computer 202, a desktop computer 204, a wearable device 206 such as e.g. a smart watch, a smart television (TV) 208, a smart phone 210, a tablet computer 212, and a server 214 in accordance with, present principles such as e.g. an Internet server that may e.g. provide cloud storage accessible to the devices 202-212. It is to be understood that the devices 202-214 are configured to communicate with each other over the network 200 to undertake present principles.

Figure 3:
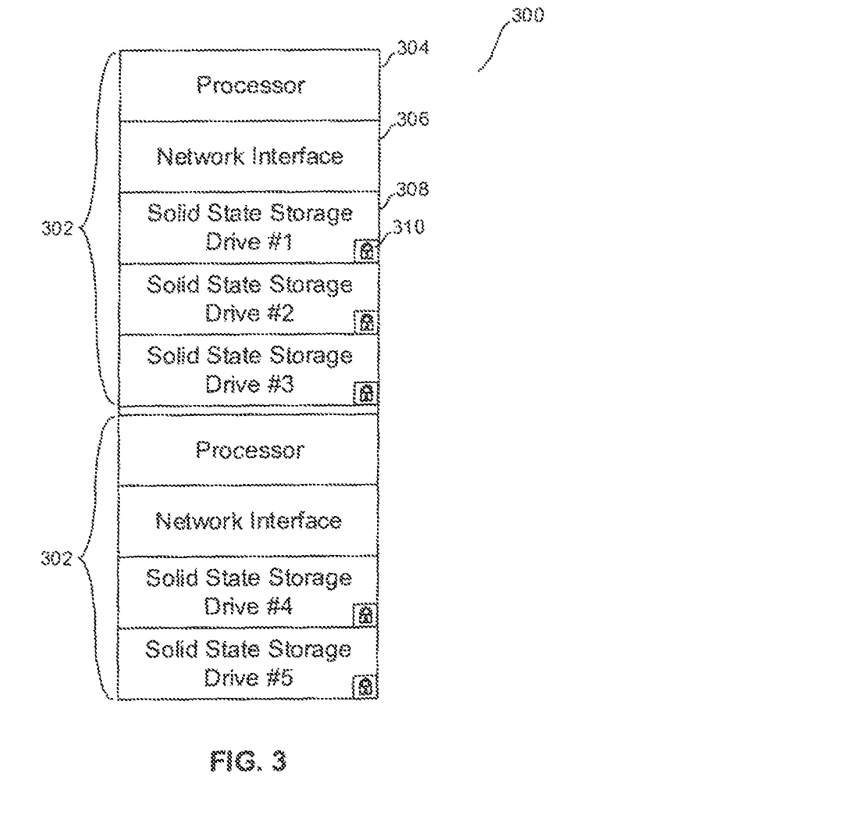
FIGS. 3-6 are block diagrams of example devices in accordance with present principles.

Referring to FIG. 3, it shows an example block diagram of a server stack 300 comprising plural server towers and/or rack servers 302 e.g. housed in a server stack housing for the server stack 300. Each server tower 302 is understood to be defined at least in part by a server tower housing which houses server components comprising at least one processor 304, at least one network interface 306 for communicating over a network such as the Internet, and at least one solid state storage drive 308. Note that each solid state storage drive (SSD) 308 comprises a lock 310 which is configured to engage with the respective server tower 302 in which the respective SSD including the lock 310 is disposed and lock the respective SSD 308 to the server tower 302 so that it cannot be physically removed therewith when e.g. unique data is stored thereon as will be discussed further below (e.g. in reference to FIGS. 8 and 9).

Figure 4:
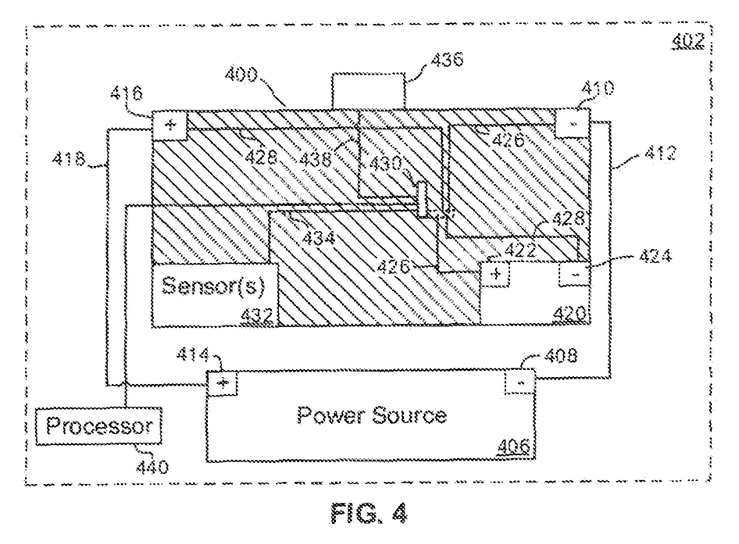
Figure 5:
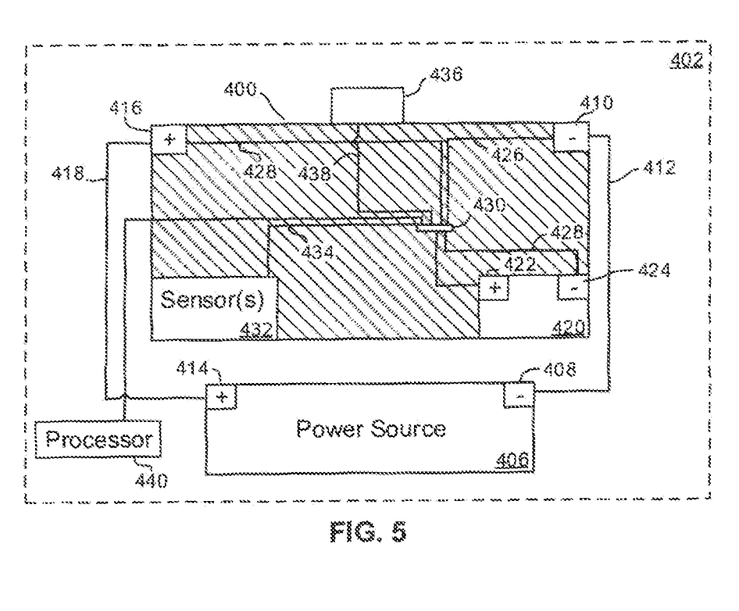

Now in cross-reference to FIGS. 4 and 5, they show an example solid state drive 400 (SSD) comprising solid state storage (e.g. as represented by the shaded region of the SSD 400). The SSD 400 is understood to be disposed in a server housing 402 such as e.g. a server tower housing. The server housing 402 comprises at least one power source 406 disposed therein with a negative terminal 408 thereof connected to a negative terminal 410 of the SSD 400 via a lead 412 and a positive terminal 414 thereof connected to a positive terminal 416 of the SSD 400 via a lead 418. Thus, note that the circuit that is established between the power source 406 and SSD 400 is in forward bias.

Furthermore, note that the SSD 400 itself includes a power source 420 disposed therein (e.g. in a case and/or enclosure of the SSD), such as e.g. a hybrid layer capacitor and/or a battery. The power source 420 includes a positive terminal 422 and a negative terminal 424. As shown in FIG. 4, note that an incomplete circuit in reverse bias has been established in which a lead 426 goes from the positive terminal 422 to negative terminal 410 but with a break in the lead 426 to render to the circuit incomplete in at least one respect, and in which a lead 428 goes from negative terminal 424 to positive terminal 416 but with a break in the lead 428 to render the circuit incomplete in at least one respect.

FIGS. 4 and 5 also show a switch 430 which is configured to complete the circuit in reverse bias upon certain conditions. E.g., input from one or more sensors 432 such as light and/or air sensors may generate a signal which may be provided to the switch 430 through electrical line 434 to cause the switch to complete the circuit configured in reverse bias between the power source 420 and terminals of the SSD 400. Note that the completed circuit in reverse bias is shown in FIG. 5.

In any case, the circuit in reverse bias may also be completed in response to actuation (e.g. depression of) a push button 436 protruding from the SSD 400 (e.g. and also in some embodiments protruding from the housing 402 when the SSD 400 is disposed therein) which may be mechanically coupled to the switch 430 via line 438 to actuate the switch 430 to complete the circuit in reverse bias in response to actuation of the button 436, and/or may be electrically coupled to the switch 430 via line 438 to responsive to actuation of the button 436 provide a signal via line 438 to the switch 430 to actuate the switch 430 to complete the circuit in reverse bias.

Still in cross-reference to FIGS. 4 and 5, note that the server housing 402 also comprises a processor 440 communicatively coupled to the switch 430 for providing commands to the switch 430 to enable the switch 430 to, and/or disable the switch 430 from, being configured to complete the circuit in reverse bias e.g. responsive to a signal from the sensor(s) 434. Also note that the processor 440 may provide commands to the switch 430 to automatically complete the circuit in response to a command from the processor 440.

Referring again to the sensor(s) 434 that are shown, they are arranged on and/or oriented on the SSD 400 with at least a portion of the sensor(s) 434 on the exterior of the housing of the SSD 400 so that the sensor(s) 434 may sense things exterior to the SSD 400. Also, note that one or more signals may be generated from the sensors 434 to actuate the switch 430 in accordance with present principles upon removal of the SSD 400 from the housing 402. For instance, if the sensor 434 is an air sensor, removal of the SSD 400 from the housing 402 will cause the sensor 434 to sense air (e.g. a change in air pressure, new air circulated to the sensor 430, a change in mass, amount, and/or weight of air abutting the sensor 434, etc.) and generate an electrical signal which is provided to the switch 430 via line 434 to actuate the switch 430 to complete the circuit in reverse bias. As another example, if the sensor 434 is a light sensor, removal of the SSD 400 from the housing 402 will cause the sensor 434 to sense light exterior to the relatively dark housing 402 in which the SSD 400 was previously disposed and generate an electrical signal which is provided to the switch 430 via line 434 to actuate the switch 430 to complete the circuit in reverse bias.

Figure 6:
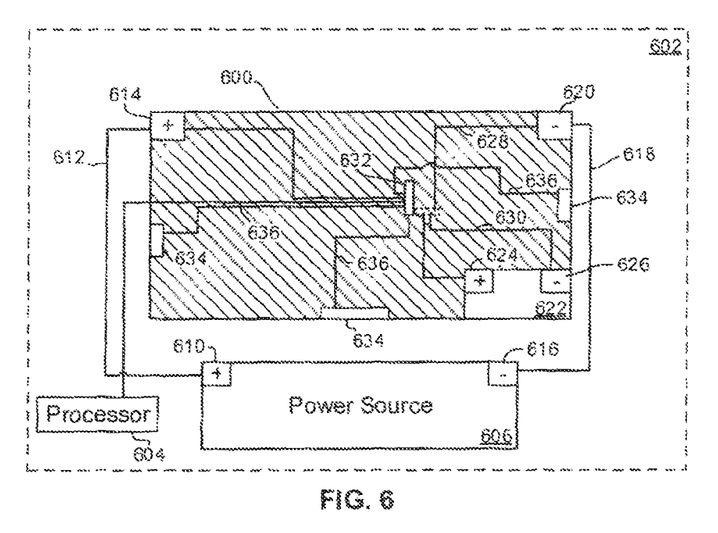

Now in reference to FIG. 6, another block diagram of an example SSD 600 disposed in a server housing 602 is shown. Note that the SSD 600 is communicatively coupled to a server processor 604. The SSD 600 is also electrically coupled to a server power source 606 (e.g. a battery, an interface receiving power from a wall outlet with which the server of the housing 602 is engaged, etc.) via a positive terminal 610 of the power source 606 being connected via line 612 to positive terminal 614 of the SSD 600, as well as a negative terminal 616 of the power source 606 being connected via line 618 to negative terminal 620 of the SSD 600. Note that the circuit that is established between the power source 606 and SSD 600 is in forward bias.

It may be appreciated from FIG. 6 that the SSD 600 includes its own internal power source 622 such as e.g. a hybrid layer capacitor which has a positive terminal 624 and a negative terminal 626. A line 628 from positive terminal 624 to negative terminal 620 and a line 630 from negative terminal 626 to positive terminal 614 establish a circuit in reverse bias. Note that as shown in FIG. 6, the lines 628 and 630 have breaks in them which can be closed based on actuation of a switch 632 to establish a complete circuit in reverse bias between the terminals 624 and 626 of the power source 622 and terminals 614 and 610 of the SSD 600.

Also, in the embodiment shown in FIG. 6, the SSD 600 is mechanically coupled to and/or engaged with the housing 602 at least at elements 634 on at least some if not all faces of the housing of the SSD 600 so that the circuit may be completed based on at least partial removal of SSD 600 from the housing 602 which in turn causes at least one of the elements 634 mechanically engaged with the housing 602 to move and in turn move respective lines 636 from the respective elements 634 to the switch 632 to cause mechanical movement of the switch 632 into a position in which it closes the breaks in the lines 628 and 630 and thus completes the circuit in reverse bias.

Before moving on, note that although not shown, a push and/or electronic (e.g. touch sensitive) button in accordance with present principles (e.g. such as the button 436 described above) may be included on the SSD 600, as may be sensors in accordance with present principles, such as e.g. air and light sensors. Thus, it is to be appreciated that the circuit in reverse bias shown in FIG. 6 may be completed various ways.

It is to be further understood at least based on the foregoing that upon completion of a circuit in reverse bias (e.g. such as shown in FIG. 5 above), at least at a threshold amount of power may be provided from a power source internal to the SSD, which in turn induces a latchup of at least one (e.g. all) parasitic structure in the SSD. In some embodiments, the latchup is irreversible, destroys at least a portion of the SSD (e.g. a semiconductor portion), and/or renders the SSD permanently inoperable. It may therefore be appreciated that unauthorized removal of a SSD may cause the circuit to be completed as referenced herein (e.g. based on a light sensor of the SSD sensing light) and thus render data (e.g. all data) on the SSD destroyed, erased, inaccessible to a processor in communication with the SSD, and/or not readable to a processor in communication with the SSD.

Figure 7:
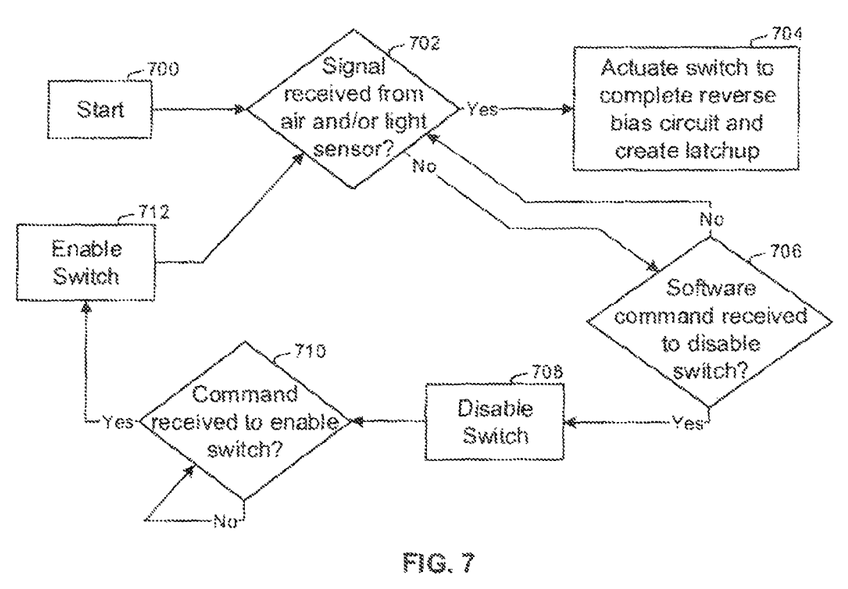
FIGS. 7 and 8 are flow charts showing example algorithms in accordance with present principles.

Now referring to FIG. 7, it shows example logic that may be undertaken by a device (e.g. a SSD) in accordance with present principles. Beginning at block 700, the logic begins and then proceeds to decision diamond 702. At diamond 702 the logic determines whether a signal has been received from an air and/or light sensor. An affirmative determination at diamond 702 causes the logic to move to block 704, at which the logic actuates a switch to complete a reverse bias circuit and create a latchup of a SSD in accordance with present principles. However, a negative determination at diamond 702 instead causes the logic to proceed to decision diamond 706.

At diamond 706 the logic determines whether a command has been received to disable the switch, such as may have come from e.g. a user providing input at a computer terminal in communication with the device undertaking the logic of FIG. 7 who has been authentication as authorized to provide such a command. A negative determination at diamond 706 causes the logic to revert back to diamond 702 and proceed therefrom. However, an affirmative determination at diamond 706 instead causes the logic to proceed to block 708, where the logic disables the switch from being actuatable (e.g. based on input from a push button or sensor) to complete the circuit configured in reverse bias. After block 708 the logic proceeds to decision diamond 710.

At diamond 710 the logic determines whether a command has been received to enable (e.g. re-enable) the switch. A negative determination at diamond 710 causes the logic to continue making the determination thereat until an affirmative one is made. Then, responsive to an affirmative determination at diamond 710, the logic proceeds to block 712 where the logic enables the switch. After block 712 the logic may then proceed back to diamond 702 and proceed therefrom.

It may thus be appreciated based on the foregoing description of FIG. 7 that a switch may be configured based on a command provided based on user manipulation of software to either be enabled to complete the circuit in reverse bias or be disabled from completing the circuit even if e.g. a signal is received from a light sensor which would otherwise cause the switch to complete the circuit. However, note that in some embodiments the switch may be configured so that it cannot be disabled from completing the circuit (e.g. is always enabled at least upon engagement with a computer housing) so that e.g. not even a network administrator can safely remove the SSD after issuing such a software command and so that the data on the SSD is thus "destroyed" upon removal of the SSD from the computer housing.

Figure 8:
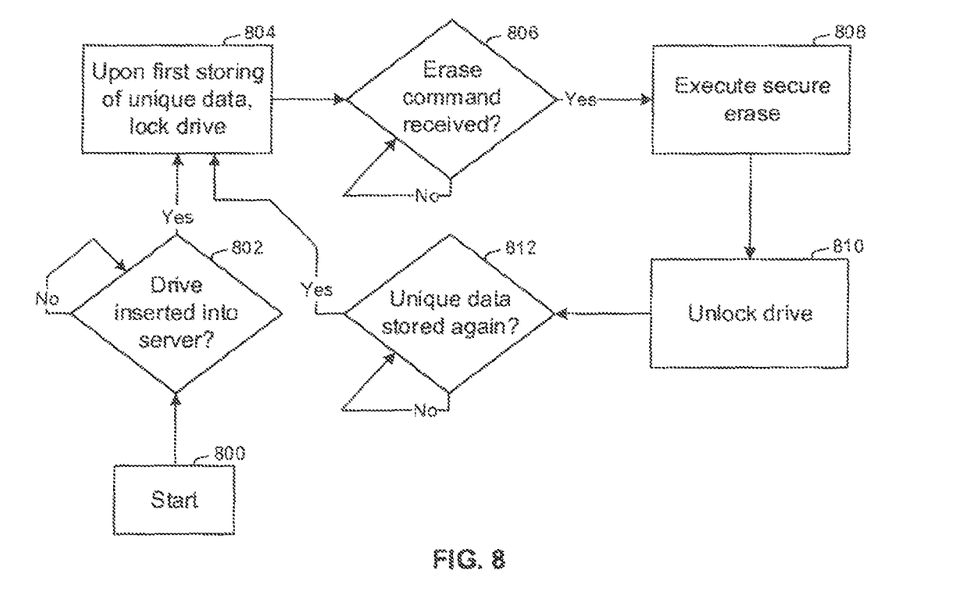

Continuing the detailed description in reference to FIG. 8, it also shows example logic that may be undertaken by a device (e.g. a SSD) in accordance with present principles. Beginning at block 800, the logic begins and then proceeds to decision diamond 802. At diamond 802 the logic determines whether the SSD has been inserted into a computer housing (e.g. of a server). A negative determination at diamond 802 causes the logic to continue making the determination thereat until an affirmative one is made. Responsive to an affirmative determination at diamond 802, the logic proceeds to block 804. At block 804 the logic, upon a first instance of unique data being stored on the SSD, actuates a lock on the SSD (e.g. such as the lock 310 described above) to physically and/or mechanically lock the SSD into the computer housing so that it cannot be removed therefrom without the lock being subsequently unlocked. It is to be understood that in some embodiments, unique data may be data other than that which may be on the SSD when received from the manufacturer of the SSD, and/or data other than that which may remain readable on the SSD subsequent to a secure erase and/or sanitation of the SSD and prior to the storing of new data on the SSD.

Regardless, and still in reference to FIG. 8, from block 804 the logic proceeds to decision diamond 806. At diamond 806 the logic determines whether an erase command (e.g. a sanitation command, a format and/or reformat command, and/or a secure erase command to erase all unique data) has been received. A negative determination causes the logic to continue making the determination thereat until an affirmative one is made. Then, responsive to an affirmative determination at diamond 806, the logic proceeds to block 808 where the logic executes an erase of the SSD (e.g. executes a secure erase). The logic then proceeds to block 810, at which responsive to the secure erase the logic unlocks the drive from the computer housing so that it may be removed therefrom. From block 810 the logic moves to decision diamond 812.

At diamond 812 the logic determines whether unique data has again been stored on the SSD. A negative determination causes the logic to continue making the determination thereat until an affirmative one is made. Then, responsive to an affirmative determination at diamond 812, the logic proceeds back to block 804 where the logic again locks the drive in the computer housing. It may thus be appreciated based on the foregoing description of FIG. 8 that a SSD may be removed in this example embodiment (e.g. only) when no unique data is stored thereon, and otherwise remains physically locked in the computer housing so that it cannot be removed.

In reference to the logic of both FIGS. 7 and 8, it is to be understood that in some embodiments the logic may be embodied in firmware in the SSD executable by a microprocessor in the SSD. Note, however, that in some embodiments such firmware need not necessarily be executed in order to control the switch (e.g. the switch may be mechanically controlled to complete the circuit based on manipulation of a push button and/or input from a sensor as described above). Accordingly, in some embodiments a SSD in accordance with present principles may include such firmware and/or a microprocessor, and in other embodiments one may not.

Figure 9:
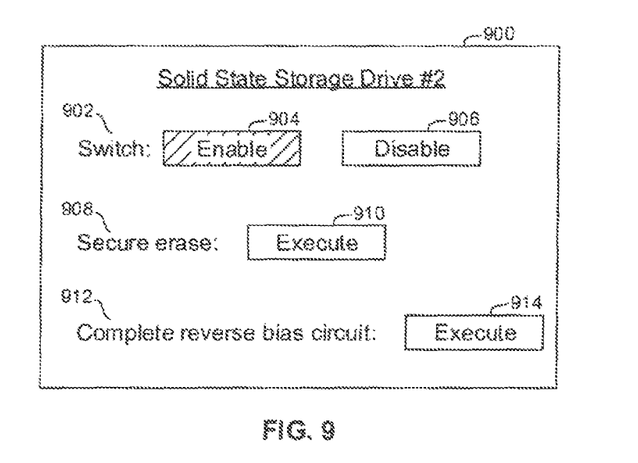
FIG. 9 is an example user interface (UI) in accordance with present principles.

Now in reference to FIG. 9, it shows an example UI 900 that may be presented on a display at a computer terminal at which a user (e.g. network, and/or server administrator) has been authenticated as authorized to control a SSD to e.g. enable or disable a switch of the SSD and/or actuate the switch to complete a circuit in reverse bias as described herein. Note that the UI 900 includes a first setting 902 for whether to enable or disable the switch for a particular SSD. The switch may be automatically without further user input enabled in response to selection of the element 904 (e.g. using a cursor, based on touch input to the display on which the UI 900 is presented, etc.) or disabled in response to selection of the element 906. Note that the switch is indicated on the UI 900 as currently being enabled based at least on the differing (e.g. darker) shading and/or coloring of the element 904 relative to the element 906.

The UI 900 also includes a second setting 908 for executing a secure erase of the particular SSD. Thus, an execute selector element 910 is shown which is selectable to automatically without further user input responsive thereto generate a command from the computer terminal to execute a secure erase of the SSD (e.g. which may subsequently and automatically without further user input actuate a lock of the SSD to cause the SSD to be unlocked from a server housing with which it is engaged in response to completion of the secure erase).

Still further, the UI 900 includes a third setting 912 for a user to input a command to complete a circuit in reverse bias within the SSD in accordance with present principles. Accordingly, a selector element 914 is shows on the UI 900 which is selectable to automatically without further user input have a command generated at the computer terminal provided to the SSD to complete a circuit in reverse bias and thus e.g. render data contained thereon unreadable to a processor.

Without reference to any particular figure, it is to be understood that a SSD in accordance with present principles may be disposed in and/or engaged with computer housings other than e.g. server housings. For instance, SSDs may be engaged with a laptop computer housing, a desktop computer housing, a tablet computer housing, etc., and may have at least one circuit in reverse bias completed in response to at least partial removal of the SSD from one of those housings. Furthermore, note that a power source internal to the SSD need not necessarily be a hybrid layer capacitor but may be e.g. a lithium ion battery or another kind of battery as well.

Also without reference to any particular figure, it is to be understood that in some embodiments an internal power source and the terminals of a SSD may establish a circuit in forward bias to provide power to the SSD, but that e.g. responsive to a signal from a light sensor as described above, an element for switching the circuit from forward bias to reverse bias in accordance with present principles may be used to switch the leads running between respective positive terminals and respective negative terminals to thus establish a completed circuit in reverse bias.

Still without reference to any particular figure, it is to be understood that in addition to SSDs, present principles apply to still other kinds of drives which use semiconductors and can thus have the drive's data "destroyed" based on actuation of a switch to complete a circuit in reverse bias as described herein.

It may now be appreciated that present principles provide for a way to e.g. destroy at least portions of semiconductor-based chips of SSDs in which data resides when the SSD is removed from a computer housing without authorization to thus render the SSD inoperable and/or unable to have data read therefrom by a processor. Notwithstanding, also note that a SSD may be safely removed without any such destruction by e.g. a user issuing a safe remove command once authenticated and/or a user issuing a secure erase command once authenticated as described herein.

In some embodiments a hardware switch in the SSD may be enabled so that if the SSD is removed from the computer housing, the SSD would be "destroyed." The authorized and/or authenticated administrator could also disable the hardware switch with a software command so that the SSD can be safely removed with the data thereon still being readable by a processor when in communication therewith. However, if the SSD is removed otherwise, e.g. even if the power to the computer housing (e.g. a server in which the SSD is disposed) is off, the SSD may be "destroyed" upon at least partial removal owing to the internal power source of the SSD which may provide enough power to create a latchup and thus "destroy" the SSD. Also in some embodiments, in addition to or in lieu of the foregoing, a hardware lock may be provided on the SSD which locks the SSD into the housing in which it is disposed. The lock may (e.g. only) be disabled alter a software "secure erase" is performed on the SSD.

Before concluding, it is to be understood that although, e.g. a software application for undertaking present principles may be vended with a device such as the system 100 and/or a SSD, present principles apply in instances where such an application is e.g. downloaded from a server to a device over a network such as the Internet. Furthermore, present principles apply in instances where e.g. such an application is included on a computer readable storage medium that is being vended and/or provided, where the computer readable storage medium is not a transitory signal and/or a signal per se.

While the particular PREVENTION OF REMOVAL OF SOLID STATE DRIVE FROM COMPUTER HOUSING WITH DATA BEING ACCESSIBLE THEREON is herein shown and described in detail, it is to be understood that the subject matter which is encompassed by the present application is limited only by the claims.

What is claimed is:

1. A device, comprising:
at least one solid state drive (SSD); and
an element which prevents removal of the device, with unique data on the SSD being accessible, from a computer housing with which the device engages;
wherein the element comprises a switch which, responsive to the device being at least partially removed from the computer housing subsequent to being engaged therewith, completes a circuit in reverse bias between a power source and the SSD.

2. The device of claim 1, wherein the computer housing houses server components.

3. The device of claim 1, wherein the computer housing is selected from the group consisting of: a server tower, a rack server.

4. The device of claim 1, comprising the power source, wherein the power source comprises a hybrid layer capacitor.

5. The device of claim 1, wherein the power source upon completion of the circuit provides power to the SSD at least at a threshold amount which induces a latchup of at least one parasitic structure in the SSD.

6. The device of claim 5, wherein the latchup is irreversible.

7. The device of claim 5, wherein the latchup destroys at least a portion of the SSD and renders the SSD permanently inoperable.

8. The device of claim 1, wherein the switch is actuated to complete the circuit in response to manipulation of a push button protruding from the device.

9. The device of claim 1, wherein the switch is actuated to complete the circuit in response to input from a light sensor.

10. The device of claim 1, wherein the switch is actuated to complete the circuit in response to input from an air sensor.

11. The device of claim 1, wherein the switch is actuated mechanically to complete the circuit based at least in part on at least partial removal of the device from the computer housing.

12. The device of claim 1, wherein the switch is disableable from completing the circuit in response to a software command and is enableable to complete the circuit in response to a software command.

13. The device of claim 1, wherein the element comprises a mechanism which engages the device with the computer enclosure.

14. The device of claim 13, wherein the mechanism comprises a hardware lock which when locked while the device is engaged with the computer housing prevents removal of the device from the computer housing with unique data being accessible on the SSD, and wherein the hardware lock is actuatable to unlock to permit disengagement of the device with the computer housing in response to deletion of the unique data.

15. The device of claim 1, wherein the unique data is data other than that which remains on the SSD subsequent to a secure erase of the SSD and prior to the storing of new data on the SSD.

16. A method, comprising:
providing at least one solid state drive (SSD); and
providing at least one mechanism which prevents removal of the SSD from a server with which the SSD is engageable when the SSD is engaged with the server and with unique data on the SSD being accessible;
wherein the at least one mechanism comprises a switch which, responsive to the SSD being at least partially removed from the server subsequent to being engaged therewith, completes a circuit in reverse bias between a power source and the SSD.

17. The method of claim 16, wherein at least one of the SSD and the mechanism comprise the power source.

18. The method of claim 16, wherein the switch is disableable from completing the circuit based on a software command and is enableable to complete the circuit in response to a software command.

19. A solid state drive (SSD), comprising:
solid state storage housed in a housing; and
at least one mechanism which disallows removal of the SSD from a computer structure with which the SSD engages with data stored on the solid state storage which is readable by a processor;
wherein the mechanism comprises a switch, a power source, and a circuit between the power source and the solid state storage which is incomplete and configured in reverse bias; and wherein the switch is configured to complete the circuit responsive to the SSD being at least partially removed from the computer structure subsequent to being engaged therewith.

20. The SSD of claim 19, wherein the switch is disableable from completing the circuit based on a software command and is enableable to complete the circuit in response to a software command.

* * * * *